US008171131B2

(12) United States Patent
Mobasser

(10) Patent No.: US 8,171,131 B2
(45) Date of Patent: May 1, 2012

(54) DEVICE FOR MANAGING THE INSERTION OF COMPLEMENTARY DATA INTO MULTIMEDIA CONTENT STREAMS

(75) Inventor: Bahman Mobasser, Maurepas (FR)

(73) Assignee: Alcatel Lucent, Paris (FR)

( * ) Notice: Subject to any disclaimer, the term of this patent is extended or adjusted under 35 U.S.C. 154(b) by 187 days.

(21) Appl. No.: 12/137,740

(22) Filed: Jun. 12, 2008

(65) Prior Publication Data

US 2008/0320073 A1 Dec. 25, 2008

(30) Foreign Application Priority Data

Jun. 19, 2007 (FR) ..................................... 07 55839

(51) Int. Cl.
*G06F 15/173* (2006.01)

(52) U.S. Cl. ........ 709/224; 709/219; 709/223; 709/232; 370/146; 370/468; 725/25

(58) Field of Classification Search ........... 709/223–226
See application file for complete search history.

(56) References Cited

U.S. PATENT DOCUMENTS

| | | | | |
|---|---|---|---|---|
| 5,825,407 | A * | 10/1998 | Cowe et al. | 725/143 |
| 6,738,978 | B1 * | 5/2004 | Hendricks et al. | 725/35 |
| 6,941,573 | B1 * | 9/2005 | Cowan et al. | 725/9 |
| 7,421,488 | B2 * | 9/2008 | Elko et al. | 709/223 |
| 7,548,962 | B2 * | 6/2009 | Weber et al. | 709/219 |
| 7,702,947 | B2 * | 4/2010 | Peddada | 714/4.1 |
| 7,802,277 | B2 * | 9/2010 | Medford | 725/25 |
| 2001/0027564 | A1 * | 10/2001 | Cowan et al. | 725/146 |
| 2002/0049703 | A1 * | 4/2002 | Uozumi | 707/1 |
| 2002/0067730 | A1 * | 6/2002 | Hinderks et al. | 370/395.52 |
| 2002/0199201 | A1 * | 12/2002 | Kurauchi | 725/104 |
| 2003/0208588 | A1 * | 11/2003 | Segal | 709/224 |
| 2004/0221304 | A1 * | 11/2004 | Sparrell et al. | 725/34 |
| 2005/0182845 | A1 * | 8/2005 | Hirayama | 709/231 |
| 2005/0272405 | A1 * | 12/2005 | Tomlinson et al. | 455/404.2 |
| 2006/0031415 | A1 * | 2/2006 | Serena | 709/219 |
| 2006/0053442 | A1 * | 3/2006 | Ridderheim et al. | 725/32 |
| 2006/0248182 | A1 * | 11/2006 | Glassco et al. | 709/223 |
| 2006/0287915 | A1 * | 12/2006 | Boulet et al. | 705/14 |
| 2006/0293954 | A1 * | 12/2006 | Anderson et al. | 705/14 |
| 2007/0005795 | A1 * | 1/2007 | Gonzalez | 709/232 |
| 2007/0022032 | A1 * | 1/2007 | Anderson et al. | 705/35 |
| 2007/0143491 | A1 * | 6/2007 | Velrajan et al. | 709/231 |
| 2007/0260627 | A1 * | 11/2007 | Knittel et al. | 707/101 |
| 2007/0288950 | A1 * | 12/2007 | Downey et al. | 725/9 |
| 2008/0021918 | A1 * | 1/2008 | Rao | 707/102 |
| 2008/0155591 | A1 * | 6/2008 | Mahajan et al. | 725/34 |

FOREIGN PATENT DOCUMENTS

| | | | |
|---|---|---|---|
| EP | 1455294 | A | 9/2004 |
| EP | 1455294 | A2 * | 9/2004 |
| WO | 9712486 | A | 4/1997 |
| WO | 9749241 | A | 12/1997 |
| WO | 0150368 | A | 7/2001 |

* cited by examiner

*Primary Examiner* — Wing Chan
*Assistant Examiner* — Razu Miah
(74) *Attorney, Agent, or Firm* — Sughrue Mion PLLC

(57) ABSTRACT

A device (D) is dedicated to managing multimedia content that is to be transmitted to communication terminals (T). This device (D) comprises management means (MM) tasked, when in the presence of a multimedia content stream to be transmitted, with determining in real time which complementary content should be inserted into selected points of said stream, from among a set of complementary content each associated with a preset profile and which may be at least partially contained within said stream, and depending on at least one criterion dealing with at least one portion of said profiles.

8 Claims, 1 Drawing Sheet

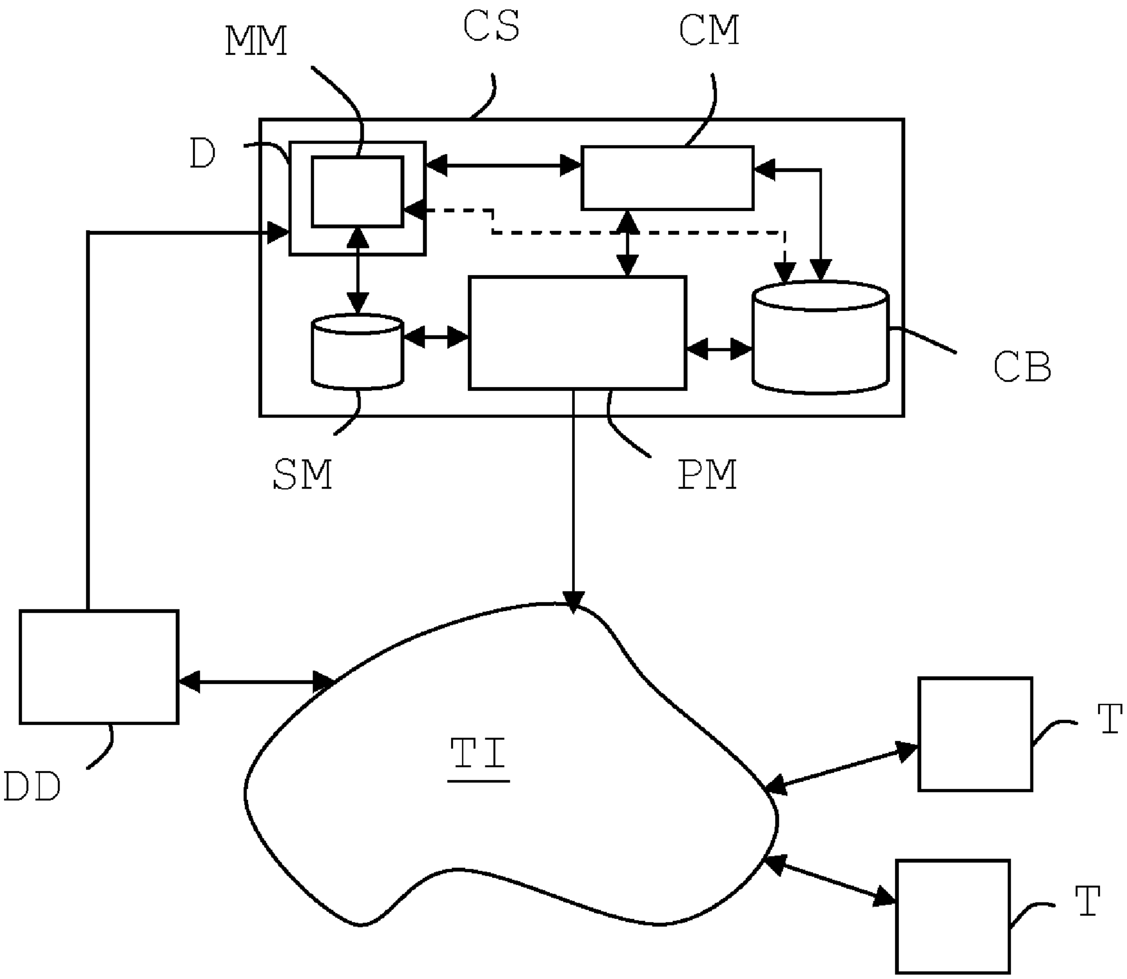
MM
CS
CM
D
CB
SM
PM
T
TI
DD
T

DEVICE FOR MANAGING THE INSERTION OF COMPLEMENTARY DATA INTO MULTIMEDIA CONTENT STREAMS

The invention pertains to the transmission of multimedia content to communication terminals using multimedia content transmission infrastructures.

Here, the term "multimedia content" refers to a set of data of the same time, such as television or radio programs, potentially for advertising purposes, data files, and audio or video files.

Furthermore, the term "multimedia content transmission infrastructure" refers to both a communication network and a distribution network.

Finally, the term "communication terminal" here refers to any fixed or mobile (or portable or cellular) communication device capable of receiving multimedia content from a multimedia content transmission infrastructure (potentially using radio waves). Consequently, it may, for example, by a land-line or mobile (or cellular) telephone, a desktop or laptop computer, a personal digital assistant (or PDA), a multimedia content receiver (such a decoder, a residential gateway, or a set-top box), as long as it is equipped with communication means, which may use radio- or satellite-based, capable of receiving multimedia content.

Multimedia content is generally transmitted to recipient communication terminals in an ordered fashion (i.e. scheduled in time) within the stream. Once the programming of a stream has been established, each piece of multimedia content in that stream is associated with set intervals of time. Afterwards, it is difficult to change the programming of the stream, such as by replacing (or substituting) one piece of multimedia content that will soon be transmitted with another piece of multimedia content, or to insert a piece of (multimedia) content between to pieces of multimedia content that will soon be transmitted.

Thus, such changes may prove to be interesting, particularly in the field of advertising, such as making the content more flexible or reactive (owing to instant recognition of viewers).

Therefore, the purpose of the invention is to enable the management of inserting and replacing multimedia content within the stream.

For this purpose, it discloses a device dedicated to managing multimedia content that will be transmitted to communication terminals, and comprising management means tasked, in the presence of a multimedia content stream to be transmitted, with determining complementary content (which may be additional and/or substitutions) in real time (dynamically) to be inserted into selected points in said stream, from among a set of complementary content which are each associated with a preset profile, and potentially are at least partially contained within the stream, and depending on at least one criterion dealing with at least one portion of the profiles, said management means being capable of being tasked with determining complementary content to be inserted not only based on at least one criterion dealing with at least one portion of the profiles, bur also on information that represents "approximate numbers" of users who are using certain multimedia content from the stream at that time (i.e. based on instant viewer data).

The management device for multimedia content that is to be transmitted to communication terminals comprises management means that are configured to determine in real time, when in the presence of a multimedia content stream to be transmitted, complementary content to insert into selected points in said stream, among a set of complementary content, each piece of which is associated with a preset profile, and potentially at least partially contained within said stream, and depending on at least one criterion that deals with at least one portion of said profiles, said management means being configured to determine said complementary content to be inserted based on at least one criterion dealing with at least one portion of said profiles and of information representing "approximate numbers" of users who are using certain pieces of multimedia content of said stream at that time.

The device of the invention may include other characteristics, which may be taken separately or in combination, in particular:

- these management means may be tasked, when determining a first piece of substitute content to insert in a selected point of a stream already occupied by a second piece of content, with ordering the replacement (or substitution) of the second piece of content by the first substitute content.
- these management means may be tasked with selecting each piece of complementary content to insert into a given stream from among a subset of complementary content chosen from among several subsets respectively associated with queues, depending on at least one selected criterion corresponding to said selected subset;
- the profiles may include information selected from among (at least) a target geographic location, a pricing plan, programming schedules, at least one target identifier, at lease one portion of a user profile, a duration for content, and an approximate number of target users (the audience);
- the criteria may, for example, be selected from among (at least) a geographic location criterion, a pricing criterion, a schedule criterion, a criterion for being on a list of identifiers, a criterion for matching at least one part of a user profile, a content duration criterion, and a criterion of a target number of users (the audience);
- it may comprise storage means tasked with storing at least some of the complementary content to be inserted due to matching their associated profiles;
- at least some of the complementary content may, for example, be advertising content;
- at least some of the complementary content may, for example, be messages.

The invention also discloses a server equipped with a management device of the same type as the one presented above.

Other characteristics and benefits of the invention will become apparent upon examining the detailed description below, and the attached drawing, in which the sole FIGURE schematically depicts an example communication installation including a content server equipped with an example embodiment of a management device of the invention, coupled to a multimedia content transmission infrastructure, to which the communication terminals are connected.

The attached drawing may serve not only to complete the invention, but may also contribute to defining it, if need be.

The purpose of the invention is particularly to enable a service provide to manage the insertion and replacement of multimedia content within multimedia content streams that are to be transmitted to communication terminals via at least one multimedia content transmission infrastructure.

In the following, by way of a non-limiting example, the communication terminals T are presumed to be cellular (or mobile) telephones. However, the invention is not limited to this type of communication terminal. In fact, it pertains to any type of fixed or mobile (or portable or cellular) communication device capable of receiving multimedia content from at least one multimedia content transmission infrastructure. Consequently, it may also be a land-line or cellular (or mobile) telephone, a desktop or portable computer, a personal digital assistant (or PDA), a multimedia content receiver (such as a decoder or an STB (set-top box)), or a CPE ("Customer Premises Equipment") device, such as a residential gateway, equipped with communication means, potentially radio- or satellite-based, capable at least of receiving distributed data and potentially exchanging data in peer-to-peer mode.

Furthermore, in the following, by way of a non-limiting example, the multimedia content transmission infrastructure is presumed to be a mobile (or cellular) communication network, such as a UMTS network capable of distribution (for example, an MBMS, or "Multimedia Broadcast/Multicast Services" network, or its advanced version, known as LTE, or "Long Term Evolution"). However, the invention is not limited to this type of infrastructure. In fact, it pertains to both wired and wireless communication networks (terrestrial and/or satellite) and to wired and wireless distribution networks (terrestrial and/or satellite). Consequently, it may be a fixed network, such as xDSL or a network with fibers or cables; a T-DMB network; a satellite network (such as an SDMB (for "Satellite Digital Multimedia Broadcast"), S-UMTS, or SDR ("Satellite Digital Radio") network; a terrestrial network, potentially radio-based, such as DVB-H (for Digital Video Broadcasting—Handhelds", used for mobile television); or a terrestrial network implementing a technology drawn from satellite technology (such as DVB-S, DVB-S2, or DVB-RCS); or a hybrid network, i.e. one that is both satellite and terrestrial, such as a DVB-SH network (satellite links with terrestrial relays).

It should be noted that any multimedia content transmission technique known to a person skilled in the art may be used, in particular the streaming technique; the public over-the-air broadcast technique, using satellite and/or terrestrial channels; the service provider over-the-air relay technique, using satellite and/or terrestrial channels; and the push-VoD technique, which involves transmitting multimedia content a certain amount of time prior to their respective scheduled dates.

Furthermore, in the following, by way of a non-limiting example, the multimedia content distributed to terminals T comprise television or radio programs and advertising (or commercials). However, the invention is not limited to these types of multimedia content. It actually pertains to any type of multimedia content, in particular videos, audio content, and downloadable applications.

As is schematically depicted in the sole FIGURE, the implementation of the invention requires the presence of at least once device D dedicated to managing multimedia content, communication terminals T (potentially of different types), a content server CS, and at least one multimedia content transmission infrastructure TI.

The content server CS is tasked with providing the infrastructure IT with multimedia content, in the form of streams, which are to be transmitted to at least some of the terminals T in accordance with preset programming. Here, each stream is made up of primary multimedia content (such as television programs) and complementary multimedia content (such as advertising content) interspersed with "content breaks" located at selected points between two pieces of primary multimedia content. It should be noted that the streams may be "linear IPTV" (television-over-IP in linear mode, in which the same television programs are distributed at the same time to numerous users, and are interspersed with intervals of time (or advertising breaks) of preset duration, which are meant for distributing advertising messages or commercials.

It should also be noted that some complementary multimedia content may be messages, potentially personal ones, that a distributer (or advertiser) wishes to transmit to one or more users. For example, a message may be intended to recall a product for examination or replacement, or to invite a user to a test, demonstration, or premiere event.

The primary multimedia content that forms part of the streams come from at least one source of multimedia content, such as a multimedia content base CB (internal here, but it may be external) or a device that delivers multimedia content (live, for example).

The complementary multimedia content that forms part of the streams come from storage means SM, which may, for example, form part of the content server CS and/or another source (such as, for example, the multimedia content base BC, or other local or remote storage means).

It should be noted that one may also envision using first storage means to store the multimedia content (primary and/or complementary) that is to be transmitted in multicast mode (such as for nationwide distribution), and to use second storage means to store the (primary and/or complementary) multimedia content that is to be transmitted in unicast mode (such as for regional or local distribution).

The content server CS comprises a module for providing multimedia content PM and a control module CM. The providing module PM is tasked with creating the multimedia content streams using primary multimedia content and complementary multimedia content, which are designated by the control module CM. To do so, it may, for example, access the multimedia content base CB and the storage means SM. The multimedia content of each stream is provided by the providing module PM to the infrastructure IT so that it can distribute it (in unicast or multicast mode).

The device is coupled to the control module CM so that can keep informed in real time of the makeup (or programming) of each stream, i.e. the ordered series of primary multimedia content (such as television programs) which are to be transmitted within each stream during selected intervals of time, and potentially complementary multimedia content (such as advertising content) which is meant to be interspersed in the content breaks that are located in selected points (in time) between the primary multimedia content of said streams.

The device D comprises a management module MM tasked with determining, in real time (dynamically), complementary multimedia content (here, advertising content) that is to be inserted in selected points (in time) of a stream, taking the knowledge of the makeup (or programming) of that stream into account This choice is made from among a set of complementary multimedia content which are each associated with a preset profile (or template), based on at least one criterion dealing with at least one portion of the profiles.

It should be noted that this set of complementary multimedia content may be made up of complementary multimedia content that comes from the storage means SM and/or the content base CB (and which, for some, may have been programmed into the stream in question). In other words, the management module MM may either insert advertising content (considered to be an addition) into the breaks provided between the television programs in a stream, or replace (substitute) a piece of advertising content planned in the initial programming for a break in the stream with another piece of advertising content (considered to be a substitution)

In the example depicted, the device D forms part of the content server CS. However, this is not mandatory. It may actually be coupled to the content server CS. Furthermore, in the example depicted, the storage means SM form part of the content server CS, while being outside the device D. However, this is not mandatory. They may actually form part of the device D, or be outside the content server CS.

Although preferable, the profiles are not necessarily stored as matches for the advertising content which are respectively associated with them. The important aspect is that the management module MM is capable of accessing advertising content profiles, so that it can determine in real time which pieces of advertising content are to be inserted into the selected points (in time) of a stream.

As indicated above, this choice is made based on at least one criterion dealing with at least one portion of the profiles.

However, additionally, it may also be done based on information which is representative of approximate numbers of users who are using certain television programs (primary multimedia content) from the stream at that moment. This information, which is generally called instant audience data, may be determined by a detection device DD which is connected to the infrastructure IT. They also make it possible to know, almost in real time, how many users are watching a given program from a range of programs at a given moment. This information may, for example, be transmitted to the device D, once they are received, by the detection device DD, so that it can take them into account when determining which advertising content to insert or replace.

The profiles (or templates) for the advertising (or complementary) content may include any type of information that sets a condition. The information (or conditions) that may be used particularly includes:

- the target geographic location. This condition sets the geographic area that an advertiser who placed a piece of advertising content wishes to reach. This location may be national, regional, local, or individual;
- the pricing plan. This condition defines the price that the advertiser who placed a piece of advertising content is willing to pay for it to be distributed;
- the programming schedules. This condition sets the times during which the advertiser who placed a piece of advertising content wants it to be distributed. The purpose of a schedule may simply be to reach certain types of users. However it may also correspond to a time when a call center is prepared to answer calls from users after they have watched a commercial;
- at least one target identifier. This condition defines a set including at least one user or terminal identifier (such as an IP address or telephone number), to which the advertiser who placed a piece of advertising content wants that content transmitted. By way of an illustrative example, an advertiser (such as a company) may wish to show identified users advertisements which relate to products (or items) that correspond to some of their previous purchases;
- at least one portion of a user profile. This condition sets one or more characteristics that define a user, such as his or her sex, age demographic, or one or more preferences or habits;
- the duration of the content. This condition sets the exact duration for viewing a piece of advertising content. At some times, when a piece of advertising content is too long (or too short), transmission may be impossible.
- the approximate number (or range of numbers) of target users. This condition defines the audience sought by the advertiser who placed a piece of advertising content.

The criteria may be of any type, as long as it deals with information (or conditions) used for defining profiles (or templates). Usable criteria may, in particular, include:

- a geographic location criterion. This criterion defines the geographic area (national, regional, local, or individual) in which the multimedia content of a stream are to be distributed,
- a pricing criterion. This criterion defines the price for distributing a piece of advertising content during a given break between two given programs;
- an availability criterion. This criterion defines a stretch of time reserved for the distribution of one or more pieces of advertising content;
- a criterion of being on a list of identifiers. This criterion defines a set of one or more user identifiers or destination terminals for a stream;
- a criterion of matching at least one part of a user profile. This criterion defines the profile or part of a profile which must match the profiles of users who are the recipients of the complementary content that is to be inserted or substituted;
- a content duration criterion. This criterion defines the duration reserved for a piece of advertising content during a given break between two given programs;
- a target user number criterion. This criterion defines the approximate number (or range of numbers) of users who are believed to be able to view a piece of advertising content during a given break between two given programs. This criterion may be defined dynamically, based on audience data received from the detection device DD.

By way of a non-limiting example, the management module MM may be configured at a given moment to make a selection based on a combination of three criteria: the target geographic area, the price, and the number of target users. Naturally, the management module MM may be reconfigured at other given moments to make selections based on any other combinations of at least one criterion dealing with profiles associated with advertising content.

It should be noted that the subsets of complementary multimedia content that each match at least one specific profile or at least one specific part of at least one specific profile may be defined, and then within a specific subset, one or more pieces of complementary multimedia content may be selected to be inserted or substituted, based on a criterion dealing with a profile of the content in the subset. For example, queues (or lists) that are each associated with a subset may be defined, and then within a queue (or list) one or more pieces of complementary multimedia content may be selected to be inserted or substituted into one or more streams, based on the rate that its/their distributer(s) offered to pay.

When the management module MM has decided to insert a piece of advertising content into a break (which is at least partially empty) in a given stream, based on one or more criteria and potentially audience information, it transmits the designation of said advertising content to the control module CM, along with the address where it is stored, as well as an order to insert that advertising content into the break in the given stream. The control module CM then completes the programming and provides said completed programming to the providing module PM, which is then tasked with extracting the advertising content (the purpose of the programming complement) from the appropriate storage means (SM or CB) before the moments for which it is scheduled.

As indicated above, the management module MM may, at certain times, based on one or more criteria and potentially on audience information, that a first piece of advertising content must replace a second piece of advertising content that had initially been scheduled for a selected point (in time) in a stream. In such a case, the management module MM transmits the designation of the first piece of advertising content to the control module CM along with the address where it is stored, as well as the designation of the second advertising content, and an order to replace the second advertising content, which is to be distributed to a selected point in a given stream, with the first advertising content. The control module CM changes the programming and provides this new programming to the providing module PM, which is then tasked with extracting the advertising content from the appropriate storage means (SM or CB) before the moments for which they are respectively scheduled.

It is important to note that streams with different recipients may include the exact same programming of primary multimedia content (here, television programs), but different programmings of complementary multimedia content (here, advertising content), upon the request of the management module MM. In other words, the management module MM may decide to fully or partially change or complete the complementary content programming of certain streams which have a given primary multimedia content programming, while leaving the complementary content programming of other streams with the same given primary multimedia content programming unchanged. It is thereby possible, particularly when dealing with linear television, to distribute the same set of television programs (primary multimedia content) to all users, but to selective distribute complementary multimedia content (commercials) to selected groups of at least one user each, with the complementary multimedia content having been specifically chosen (such as from preset queues or lists) based on their respective user profiles, substituting for at least some of the initially programmed complementary multimedia content.

The management device D of the invention, and in particular its management module MM, may be constructed in the form of electronic circuits, software (or computing) modules, or a combination of circuits and software.

The invention is not limited to the embodiments of the management device and multimedia content server described above, which are only given as an example; rather, it encompasses all variants that a person skilled in the art may envision within the claims given below.

The invention claimed is:

1. A device for managing multimedia content that is to be transmitted to communication terminals, said device comprising management circuitry configured, when in the presence of a multimedia content stream to be transmitted, to determine in real time which complementary content should be inserted into selected points of said stream, from among a set of complementary content each associated with a preset profile and which may be at least partially contained within said stream, and depending on at least one criterion dealing with at least one portion of said profiles, said management circuitry being configured to determine said complementary content to be inserted based on at least one criterion dealing with at least one portion of said profiles and information representing numbers of users who are using certain pieces of multimedia content of said stream at that time, wherein said profiles include information selected from a group comprising at least a target geographic location, a pricing plan, programming schedules, at least one target identifier, at least one part of a user profile, one content duration, and a number of target users.

2. The device according to claim 1, wherein said management circuitry are configured to select each piece of complementary content to insert into a given stream from among a subset of complementary content chosen from among multiple subsets respectively associated with queues, depending on at least one selected criterion corresponding to said selected subset.

3. The device according to claim 1, wherein it comprises a storage unit configured to store at least some of said complementary content to be inserted due to matching their associated profiles.

4. The device according to claim 1, wherein at least some of said complementary content is advertising content.

5. The device according to claim 1, wherein at least some of said complementary content is messages.

6. A device for managing multimedia content that is to be transmitted to communication terminals, said device comprising management circuitry configured, when in the presence of a multimedia content stream to be transmitted, to determine in real time which complementary content should be inserted into selected points of said stream, from among a set of complementary content each associated with a preset profile and which may be at least partially contained within said stream, and depending on at least one criterion dealing with at least one portion of said profiles, said management circuitry being configured to determine said complementary content to be inserted based on at least one criterion dealing with at least one portion of said profiles and information representing numbers of users who are using certain pieces of multimedia content of said stream at that time, wherein said management circuitry are configured, when choosing a first piece of complementary content to insert in a selected point in a stream already occupied by a second piece of complementary content, to order the replacement of said second piece of complementary content by said first piece of complementary content.

7. A device for managing multimedia content that is to be transmitted to communication terminals, said device comprising management circuitry configured, when in the presence of a multimedia content stream to be transmitted, to determine in real time which complementary content should be inserted into selected points of said stream, from among a set of complementary content each associated with a preset profile and which may be at least partially contained within said stream, and depending on at least one criterion dealing with at least one portion of said profiles, said management circuitry being configured to determine said complementary content to be inserted based on at least one criterion dealing with at least one portion of said profiles and information representing numbers of users who are using certain pieces of multimedia content of said stream at that time, wherein said criteria are chosen from a group comprising at least one geographic location criterion, one pricing criterion, one schedule criterion, one criterion of being on a list of identifiers, one criterion of matching at least one part of a user profile, one content duration criterion, and one criterion of the number of target users.

8. A content server, said content server comprising a management device for managing multimedia content that is to be transmitted to communication terminals, wherein the management device comprises management circuitry configured, when in the presence of a multimedia content stream to be transmitted, to determine in real time which complementary content should be inserted into selected points of said stream, from among a set of complementary content each associated with a preset profile and which may be at least partially contained within said stream, and depending on at least one criterion dealing with at least one portion of said profiles, said management circuitry being configured to determine said complementary content to be inserted based on at least one criterion dealing with at least one portion of said profiles and information representing numbers of users who are using certain pieces of multimedia content of said stream at that time, wherein said profiles include information selected from a group comprising at least a target geographic location, a pricing plan, programming schedules, at least one target identifier, at least one part of a user profile, one content duration, and a number of target users.

* * * * *